3,253,052
PREPARATION OF SYNTHETIC LUBRICATING OIL

Donald H. Antonsen, Glen Mills, and Robert H. Johnson, Swarthmore, Pa., assignors to Sun Oil Company, Philadelphia, Pa., a corporation of New Jersey
No Drawing. Filed Dec. 31, 1963, Ser. No. 334,904
14 Claims. (Cl. 260—683.15)

This invention relates to the preparation of synthetic lubricating oils having unusually high viscosity indexes and low pour points by the polymerization of certain straight chain alpha olefins by means of a particular type of catalyst system.

There are various special application for lubricating oils in which it is highly desirable that the oil employed have an especially high viscosity index, for example, a V.I. above 130. The oil also should have a low pour point, e.g., below $-30°$ F., high oxidation stability and lubricating properties that provide good wear characteristics. One such application is in the lubrication of jet aircraft wherein conditions of both low and high temperature may be encountered. Other special applications in which lubricants having such characteristics are desirable are automatic transmission lubrication, high temperature hydraulic applications and brake fluids. Lubricating oils that can be derived from petroleum generally do not have the combination of properties desired for these special applications.

Lubricating oils having viscosity indexes considerably higher than for those normally derived from petroleum have been prepared heretofore by the polymerization of various olefins. In the prior art several catalyst systems have been disclosed for effecting this reaction to produce oily polymers. Aluminum chloride is one of the catalysts that has been used for this purpose (Montgomery et al. United States Patent No. 2,559,984). This catalyst promotes reaction by a cationic type of mechanism, and accordingly it not only effects polymerization of the olefin but also causes isomerization of both the olefin monomer before polymerization and the polymerization product. This is disadvantageous, since the polymer products obtained in systems where isomerization occurs have lower viscosity indexes than would result in the absence of isomerization.

Garwood United States Patent No. 2,937,129 discloses the use of another type of catalyst system for producing polymeric lubricating oils, namely, ditertiary alkyl peroxides. This type of catalyst, which is used at a temperature of the order of 150° C., promotes reactions by a free radical mechanism and it also has the disadvantage of causing isomerization as well as polymerization to occur.

The polymerization of ethylene to oils by utilizing a combination of $TiCl_4$ and an aluminum alkyl halide such as aluminum ethyl sesquichloride has been described in White et al. United States Patent No. 2,993,942. This type of catalyst system contains both anionic and catonic components, and with higher olefins it also will cause isomerization of the olefin monomer and polymer product to occur. With ethylene as the starting olefin, isomerization of the monomer of course cannot take place but the polymer product has such a high pour point that it generally is not a suitable lubricant for the special types of applications referred to above.

The present invention is directed to the preparation of synthetic lubricating oils by the polymerization of alpha olefins utilizing a catalyst system which minimizes isomerization reactions and provides other benefits over catalyst systems heretofore used. The starting olefin can be any straight chain alpha olefin of the $C_6$–$C_{14}$ range or mixture thereof. The total oil product boiling above 650° F. that is produced by the reaction generally has a viscosity index above 130 and a pour point substantially below $-30°$ F. Distillate fractions obtained therefrom have outstandingly good low temperature characteristics, exhibiting viscosities at $-65°$ F. which are considerably below values predicted by extrapolation from the viscosities measured at 100° and 210° F. The product, after hydrogenation to saturate double bonds in the polymer, has excellent oxidation stability and provides good wear characteristics in lubricating applications. The invention can be utilized to make products ranging widely in viscosity and having numerous specialty applications.

The invention has particular utility in the manufacture of synthetic oils for use in formulating jet aircraft lubricants such as those conforming to U.S. Military Specification MIL–L–7808E (March 13, 1963). This specification includes the following property requirements: visc. @ 210° F.=3.0 cs. (min.); vis. @ 100° F.=11.0 cs. (min.); flash point=400° F. (min.); four point=$-75°$ F. (max.); and visc. @ $-65°$ F. <13,000 cs. The last-mentioned requirement with respect to viscosity at $-65°$ F. is particularly difficult to meet and polyolefin oils generally fail this requirement. Oils can be produced by the present process, however, which meet this low temperature requirement. It is typical of the present products that their actual viscosities at $-65°$ F. are considerably lower than would be expected from their viscosities at 100° and 210° F.

According to the invention, synthetic lubricating oils are prepared by contacting one or more alpha olefins of the $C_6$–$C_{14}$ range at a temperature in the range of 0–50° C. with a catalyst system formed from the following three types of components:

(1) Aluminum alkyl sesquichloride or dialkyl monochloride,
(2) Titanium tetrachloride,
(3) A di-tertiary-alkyl peroxide.

The peroxide component of the catalyst system can be any peroxide represented by the formula ROOR' wherein R and R' are the same or different tertiary alkyl radicals having, for example, up to twenty carbon atoms. The lower peroxides such as di-tertiary-butyl peroxide or di-tertiary amyl peroxide are preferred.

The aluminum-containing component of the catalyst system can be either a sesquichloride or an aluminum dialkyl monochloride. Neither aluminum trialkyls nor aluminum alkyl dichlorides are suitable, as the desired results cannot be obtained when either of the latter types of aluminum compounds are combined with the other catalyst components above specified. The alkyl groups in the sesquichloride or dialkylchloride can contain from one to ten carbon atoms and preferably are straight chain alkyl groups. The sesquichloride or dialkyl chloride component can contain branched chain alkyl groups such as isobutyl or isopentyl, although this is not preferred. Examples of suitable alkyl gorups are methyl, ethyl, propyl, n-butyl, n-hexyl, n-octyl and n-decyl. Use of a sesquichloride as catalyst component results in lower viscosity for the total polymer product than when a dialkyl chloride is used.

It is highly important for obtaining the best products in good yield that the three components of the catalyst system be present in certain proportions. In the first place the aluminum compound and the titanium tetrachloride should be used in amounts such that the atomic ratio of Al to Ti is in the range of 0.5–2.5, more preferably 1.0–1.6 in the case of sesquichlorides and 0.7–1.3 in the case of the monochlorides. At Al:Ti ratios below 0.5 the desired viscosity-temperature characteristics of the product cannot be secured, while at ratios above 2.5 the viscosity-temperature characteristics for the oils are poorer and also there is a tendency to produce solid polymers. Secondly, it is highly important the amount of peroxide employed in the catalyst system be such that the atomic ratio of O to Al is within a certain narrow range. This range is 0.3:1 to 0.9:1, and the preferred ranges are 0.4–0.8. At O to Al ratios below 0.3:1 lower yields of product are obtained and, particularly in the case of the sesquichloride, poorer viscosity-temperature characteristics of the product result. An increase of the ratio above 0.9 causes a sharp drop in the yield of product. For preparing jet aircraft lubricants the most preferable O to Al ratios are about 0.5 to 0.67. Increasing the O to Al ratio within the specified range generally increases the average viscosity of the polymer oil produced.

The polymerization reaction can be carried out either with or without a solvent being employed. When no solvent is used, the olefin charge itself functions as the reaction medium and the catalyst is prepared in situ by adding the three above-specified catalyst components to the olefin monomer. In the absence of a solvent there is a tendency for the catalyst to degradate more rapidly and its rate of deterioration depends upon its concentration; hence the olefin to $TiCl_4$ weight ratio preferably should be in excess of 100:1. Alternatively the reaction can be carried out in the presence of a solvent which can be a saturated hydrocarbon or certain types of halohydrocarbons, in which case olefin to $TiCl_4$ ratios below 100:1 can be used if desired without undue degradation of the catalyst occurring. When a saturated hydrocarbon solvent is used, the properties of the polymer oils obtained are substantially the same as when no solvent is employed. On the other hand the use of a halohydrocarbon solvent tends to shift the product molecular weight downwardly and give oils of lower viscosity.

When a saturated hydrocarbon solvent is used, it can be a paraffinic hydrocarbon, including both n-paraffins and isoparaffins, or a naphthenic hydrocarbon or mixtures thereof. Examples of suitable hydrocarbon solvents are n-pentane, isopentane, hexanes, octanes, decanes, cyclohexane, methylcyclopentane, dimehylcyclohexane and the like. An aromatic hydrocarbon, such as benzene or toluene, should not be used since it causes the formation of too much dimer which boils below the lubricating oil range desired. Also with an aromatic hydrocarbon solvent, there is a tendency to obtain alkylation of the aromatic if even small amounts of water happen to be present in the system.

The types of halohydrocarbons that are suitable as the reaction medium are halobenzenes having 1–2 halogen atoms, trihaloethanes, tetrahaloethanes, trihaloethylenes and tetrahaloethylenes, in which halohydrocarbons the halogen can be either chlorine or fluorine or both. Particularly suitable solvents are the monohalobenzenes, viz., chlorobenzene and fluorobenzene, and dihalobenzenes which are liquid at the reaction temperature such as ortho- and meta-dichlorobenzenes or difluorobenzenes, since with such solvents considerably higher yields of polymer lubricating oil per gram of $TiCl_4$ used are often obtainable than when a saturated hydrocarbon reaction medium is employed. Examples of other halohydrocarbons that can be used are: methyl chloroform; 1,1,2-trichloroethane; 1,1,2,2,-tetrachloroethane; trifluoroethanes; chlorodifluoroethanes; tetrafluoroethane; and similar ethylene derivatives containing 3–4 halogen atoms which are chlorine and/or fluorine. In using a solvent the weight ratio thereof to olefin monomer generally is in the range of 1:2 to 4:1.

The weight proportion of olefin charge to titanium tetrachloride used in the reaction mixture can vary widely, ranging for example from 25:1 to 1000:1 depending upon the purity of the olefin charge, the absence or presence of a solvent, the type of solvent used and whether the aluminum alkyl compound employed is a sesquichloride or a monochloride. When highly purified olefin monomer is used and the aluminum compound is a sesquichloride, 75–85% of the olefin typically can be converted to higher boiling products at olefin to $TiCl_4$ ratios up to 500:1 either in the presence or absence of a solvent. On the other hand, when diethyl aluminum chloride is used with a highly purified monomer charge, the presence or absence of and the type of solvent employed have an influence on the product yield obtained. Thus with no solvent or with a saturated hydrocarbon solvent conversions typically are about 50% at a 200:1 olefin to $TiCl_4$ ratio and 75% at a 100:1 ratio, while for chlorohydrocarbon solvents typical conversions in using diethyl aluminum chloride are 80–85% at ratios of 300:1 or less and 55% at a 500:1 ratio.

The temperature for carrying out the reaction is in the range of 0–50° C. With a saturated hydrocarbon solvent a temperature of 10–30° C. preferably is used, while with a halohydrocarbon solvent the preferred temperature is 25–40° C. The molecular weight of the product tends to increase with increasing reaction temperature. At temperatures below 0° C. substantially no reaction is obtained, while at temperatures above 50° C. the viscosity of the product becomes extremely high and also the catalyst becomes considerably less active.

After the polymerization reaction has been completed, the catalyst can be deactivated and its residues removed in any conventional or suitable manner and the reaction mixture can be fractionated to recover the reaction medium and unreacted monomer. The polymer product can then be distilled to separate synthetic oils of boiling ranges as desired. The synthetic oils obtained preferably are hydrogenated in known manner prior to use in lubricating applications. Typical conditions for liquid phase hydrogenation using a Raney nickel catalyst comprise temperatures in the range of 150–250° C. and a hydrogen pressure in the range of 1000–2500 p.s.i.g. The resulting hydrogenated products have outstanding oxidation stabilities and lubricating characteristics.

The following examples illustrate the invention more specifically:

EXAMPLE I

Two comparative runs for polymerizing octene-1 were carried out in a stirred reactor which had been carefully cleaned and dried beforehand. Each run was made without an added solvent and using aluminum ethyl sesquichloride and $TiCl_4$ in amounts such that the Al:Ti atomic ratio was 1.25 and the weight ratio of octene-1 to $TiCl_4$ was 300:1. One run was made without any other catalyst component, while in the other run ditertiary-butyl peroxide was incorporated in the catalyst system in amount such that the atomic ratio of O:Al was 0.5. Both runs were carried out at 30° C. for 20 hours. The catalyst was then deactivated by adding to the reaction mixture 20 g. of $Na_2CO_3$, adding 25 ml. of water with thorough mixing and then filtering. The filtrate was distilled to recover unpolymerized octene and to remove from the polymer the dimer fraction which boiled below 650° F. Product yields and viscosity properties are shown in Table 1.

*Table 1*

| O:Al Ratio | Percent Conversion of Octene-1 | Percent Dimer Obtained | Total Oil Above 650° F. | | |
|---|---|---|---|---|---|
| | | | KV at 100° F., cs. | KV at 210° F., cs. | V.I. |
| 0.00 | 57.7 | 14.7 | 45.1 | 7.92 | 140 |
| 0.50 | 82.0 | 20.0 | 38.1 | 7.37 | 148 |

The values listed for percent conversion show that a distinct increase in yield was obtained by incorporating the peroxide in the catalyst. The results also show that addition of peroxide to the catalyst tends to decrease the viscosity of the polymer oil obtained.

The polymer oil obtained from the run in which the peroxide was used was vacuum distilled to obtain distillate and residue fractions as shown in Table 2. The table also shows viscosity characteristics of the fractions, including viscosities as measured at −65° F. compared with the values obtained by extrapolation from the viscosities at 100° and 210° F.

Table 2

| Fraction (Cut points at atmos. press.) | Percent of Total Polymer | KV at 100° F., cs. | KV at 210° F., cs. | V.I. | KV at −65° F. | |
|---|---|---|---|---|---|---|
| | | | | | Measured | Extrapolated |
| Trimer (650–715° F.) | 18.6 | 8.39 | 2.39 | 116 | 1,970 | 4,000 |
| Tetramer (715–850° F.) | 17.0 | 19.43 | 4.08 | 128 | 14,257 | 55,000 |
| Pentamer (850–1,000° F.) | 10.4 | 33.70 | 5.92 | 129 | 51,032 | 150,000 |
| Residue | 34.0 | 413.5 | 40.6 | 125 | | |

The comparison shows that the actual viscosities at −65° F. are considerably less than the values that would be expected from a projection of the viscosity-temperature curve based on the 100° and 210° F. data. This circumstance is important in utilizing the invention for the manufacture of jet aircraft lubricants meeting the requirements of Specification MIL-L-7808E.

EXAMPLE II

Two runs were made in which the octene-1 was polymerized using as catalyst a combination of $TiCl_4$, diethyl aluminum chloride and di-tertiary-butyl peroxide. In each run chlorobenzene was added as solvent in amount of 0.43 vol. per vol. octene-1, the $TiCl_4$ and diethyl aluminum chloride were used in amounts such that the Al:Ti atomic ratio was 1.0, the weight ratio of octene-1 to $TiCl_4$ was 300:1 and the reaction was carried out at 30° C. for 20 hours. The amount of peroxide was varied between the runs as indicated by the O:Al atomic ratios in Table 3.

Table 3

| O:Al Ratio | Percent Conversion of Octene-1 | Percent Dimer Obtained | Total Oil Above 650° F. | | |
|---|---|---|---|---|---|
| | | | KV at 100° F., cs. | KV at 210° F., cs. | V.I. |
| 0.5 | 74.0 | 18.4 | 40.1 | 7.28 | 142 |
| 1.0 | 14.5 | 11.9 | 113 | 14.8 | 128 |

The data in Table 3 show that the amount of peroxide incorporated in the catalyst should not be sufficient to give an O:Al ratio in excess of 0.9, as this will cause a sharp decrease in the percent conversion.

EXAMPLE III

Octene-1 was polymerized in two runs using $TiCl_4$ and diethyl aluminum chloride in amounts such that the Al:Ti ratio was 2.0. The runs differed from each other with regard to the presence or absence of di-tertiary-butyl peroxide in the catlyst and the concentration of catalyst in the olefin monomer, as indicated in Table. 4. Chlorobenzene was used as solvent and the runs otherwise were carried out in generally the same manner as in Example II. Results were as follows:

Table 4

| O:Al Ratio | Wt. Ratio Octene-1: $TiCl_4$ | Percent Conversion of Octene-1 | Percent Dimer Obtained | Total Oil Above 650° F. | | |
|---|---|---|---|---|---|---|
| | | | | KV at 100° F., cs. | KV at 210° F., cs. | V.I. |
| 0.0 | 100 | 69.2 | 13.4 | 591 | 74.3 | 129 |
| 0.5 | 300 | 84.2 | 12.6 | 312 | 41.3 | 133 |

The data show that a substantially lower yield was obtained when the peroxide was omitted (O:Al ratio=0.0) than when it was used, in spite of the fact that the run without it was made at higher catalyst concentration. Using an octene-1:$TiCl_4$ ratio of 300:1 and no peroxide in the catalyst, the conversion would have been only of the order of 50%. These results indicate that a distinct improvement in conversion can be obtained by incorporating a di-tertiary-alkyl peroxide in the catalyst system.

When other di-tertiary-alkyl-peroxides are substituted for di-tertiary-butyl peroxide, results substantially similar to those shown in the foregoing examples are obtained.

We claim:

1. Method of preparing a synthetic lubricating oil which comprises contacting straight chain alpha olefin of the $C_6$–$C_{14}$ range at a temperature in the range of 0–50°C. with a catalyst system formed from (1) an aluminum compound selected from the group consisting of aluminum alkyl sesquichlorides and aluminum dialkyl monochlorides, (2) titanium tetrachloride and (3) a di-tertiary-alkyl peroxide, the amounts of said aluminum compound and titanium tetrachloride being such that the atomic ratio of Al to Ti is in the range of 0.5–2.5 and the amount of said peroxide being such that the atomic ratio of O to Al is in the range of 0.3–0.9, and thereafter separating from the reaction mixture olefin polmer of lubricating oil boiling range.

2. Method according to claim 1 wherein the aluminum compound is an aluminum alkyl sesquichloride and the ratio of O to Al is in the range of 0.4–0.8.

3. Method according to claim 2 wherein the Al to Ti ratio is in the range of 1.0–1.6.

4. Method according to claim 3 wherein said peroxide is di-tertiary-butyl peroxide.

5. Method according to claim 3 wherein said peroxide is di-tertiary-amyl peroxide.

6. Method according to claim 1 wherein the aluminum compound is an aluminum dialkyl monchloride and the ratio of O to Al is in the range of 0.4–0.8.

7. Method according to claim 6 wherein the Al to Ti ratio is in the range of 0.7–1.3.

8. Method according to claim 7 wherein said peroxide is di-tertiary-butyl peroxide.

9. Method according to claim 7 wherein said peroxide is di-tertiary-amyl peroxide.

10. Method according to claim 1 wherein said peroxide is di-tertiary-butyl peroxide.

11. Method according to claim 1 wherein said peroxide is di-tertiary-amyl peroxide.

12. Method according to claim 1 wherein said temperature is in the range of 10–40° C.

13. Method of preparing a synthetic lubricating oil which comprises contacting straight chain alpha olefin of the $C_6$–$C_{14}$ range at a temperature in the range of 10–40° C. with a catalyst system formed from an aluminum alkyl sesquichloride, titanium tetrachloride and a di-tertiary-alkyl peroxide, the amounts of the aluminum alkyl sesquichloride and titanium tetrachloride being such that the atomic ratio of Al to Ti is in the range of 1.0–1.6 and the amount of said peroxide being such that the atomic ratio of O to Al is in the range of 0.4–0.8, and thereafter separating from the reaction mixture olefin polymer of lubricating oil boiling range.

14. Method of preparing a synthetic lubricating oil which comprises contacting straight chain alpha olefin of the $C_6$–$C_{14}$ range at a temperature in the range of 10–40° C. with a catalyst system formed from an aluminum dialkyl monochloride, titanium tetrachloride and a di-tertiary-alkyl peroxide, the amounts of the aluminum dialkyl monchloride and titianium tetrachloride being such that the atomic ratio of Al to Ti is in the range of 0.7–1.3 and the amount of said peroxide being such that the atomic ratio of O to Al is in the range of 0.4–0.8, and thereafter separating from the reaction mixture olefin polymer of lubricating oil boiling range.

References Cited by the Examiner
UNITED STATES PATENTS

| | | | |
|---|---|---|---|
| 2,993,942 | 7/1961 | White et al. | 260—683.15 |
| 3,108,145 | 10/1963 | Antonsen | 260—683.15 |
| 3,179,711 | 4/1965 | Antonsen | 260—683.15 |

DELBERT E. GANTZ, *Primary Examiner.*

R. H. SHUBERT, *Assistant Examiner.*